United States Patent
Shpilyuck et al.

(10) Patent No.: US 11,487,570 B1
(45) Date of Patent: Nov. 1, 2022

(54) EFFICIENT CREATION OF ENDPOINTS FOR ACCESSING SERVICES DIRECTLY WITHIN A CLOUD-BASED SYSTEM

(71) Applicant: EMC IP Holding Company LLC, Hopkinton, MA (US)

(72) Inventors: Boris Shpilyuck, Ashdod (IL); Yossi Matatov, Rehovot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 343 days.

(21) Appl. No.: 16/601,752

(22) Filed: Oct. 15, 2019

(51) Int. Cl.
  *G06F 9/455* (2018.01)
  *G06F 9/50* (2006.01)
  *G06F 11/14* (2006.01)
  *H04L 9/40* (2022.01)
  *H04L 41/08* (2022.01)

(52) U.S. Cl.
  CPC ........ *G06F 9/45558* (2013.01); *G06F 9/5072* (2013.01); *G06F 11/1402* (2013.01); *H04L 41/0879* (2013.01); *H04L 63/0272* (2013.01); *H04L 63/101* (2013.01); *G06F 2009/45562* (2013.01); *G06F 2009/45591* (2013.01); *G06F 2009/45595* (2013.01)

(58) Field of Classification Search
  CPC .............. G06F 9/45558; G06F 9/5072; G06F 11/1402; G06F 2009/45562; G06F 2009/45591; G06F 2009/45595; H04L 41/0879; H04L 63/0272; H04L 63/101
  See application file for complete search history.

(56) References Cited

U.S. PATENT DOCUMENTS

| | | | |
|---|---|---|---|
| 9,286,093 B1* | 3/2016 | Yin | G06F 9/45558 |
| 9,935,830 B1* | 4/2018 | Mahapatra | H04L 41/0816 |
| 2015/0081451 A1* | 3/2015 | Robinson | H04L 51/10 705/14.66 |
| 2016/0164924 A1* | 6/2016 | Rosenberg | G06F 9/5061 709/227 |
| 2018/0212880 A1* | 7/2018 | Mostert | H04L 47/12 |
| 2019/0034298 A1* | 1/2019 | Maskalik | G06F 9/45558 |

* cited by examiner

*Primary Examiner* — Dong U Kim
(74) *Attorney, Agent, or Firm* — Dergosits & Noah LLP; Todd A. Noah (57) ABSTRACT

Described is a system (and method) that provides the ability to create an endpoint to allow cloud-based components to access services directly using network infrastructure of a cloud system. To provide such an ability, access connections from components of a production system to the cloud system may be monitored to derive a storage service and a datastore based on portions of a domain name. The derived storage service and datastore are then used to determine configuration settings required to automatically create a service endpoint. The service endpoint may then be deployed within the cloud system allowing the cloud-based component to access the storage service directly. Accordingly, the system provides the ability to automatically configure and deploy service endpoints by leveraging information derived from monitoring network access connections between a production environment and a cloud environment.

20 Claims, 5 Drawing Sheets

EFFICIENT CREATION OF ENDPOINTS FOR ACCESSING SERVICES DIRECTLY WITHIN A CLOUD-BASED SYSTEM

TECHNICAL FIELD

This disclosure relates to managing components within a cloud-based system, and more particularly, efficiently creating service endpoints for directly accessing services of a cloud-based system.

BACKGROUND

Cloud-based systems provide various services that are crucial for enterprise level network clients. In some configurations, components of a production system (or on-premises system) such as a virtual machine may store data using a cloud-based service provided by a cloud service system. In addition, various other services may also be offered by the cloud service system such as cloud-based disaster recovery services. Accordingly, in response to disaster event, a recovery virtual machine may be created within the same cloud service system that provides the storage service. However, recovery virtual machines often clone all aspects of a corresponding production virtual machine including the mechanisms used to access the cloud-based storage services. As a result, despite the recovery virtual machine executing within the cloud service system, the mechanism used to connect to a cloud-based service may include connecting to networks (e.g. Internet) and components that are external to the cloud-based system. This may lead to inefficiencies with respect to performance, bandwidth, execution time, and other factors relevant to a disaster recovery process. Accordingly, there is a continued need for efficient access management of cloud-based services.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for creating endpoints for accessing services directly within a cloud service system (or cloud-based system). For example, the system provides the ability to automatically create service endpoints that allow components to access storage services directly using network infrastructure of a cloud service system. To provide such an ability, the system may monitor a set of network access connections from a production system to the cloud service system. For example, the system may store information including a uniform resource locator (URL) used by a virtual machine (VM) of a production system to access a storage service provided by the cloud service system. The system may determine a datastore (or a service entity) and a storage service based on portions of a domain name within the URL. As described, a recovery VM may be created within the cloud storage service in response to a disaster event. Because the recovery VM may be created as part of the same cloud service system that also provides the storage service for the original production VM, the recovery VM may leverage this configuration by connecting to such service directly using the network infrastructure (or "backbone") of the cloud service system. Accordingly, the system may determine configuration settings for the service endpoint based the determined datastore and storage service derived from monitoring the network access connections of the production VM. The system may provide (or recommend) such configuration settings to a user for modification or confirmation. The system may then create the service endpoint using the determined configuration settings. As a result, the service endpoint allows a recovery VM to access the storage service directly using the private network of the cloud service system. Thus, in some embodiments, the system provides the ability to automatically configure and deploy service endpoints by leveraging information derived from monitoring network access connections between a production environment and a cloud-based environment.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Data Domain data protection platform provided by Dell EMC™ Corporation, and associated systems, methods, and components, although use of this particular platform is provided only by way of illustration and is not required.

In some embodiments, the environment (or system) may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

Figure 1:
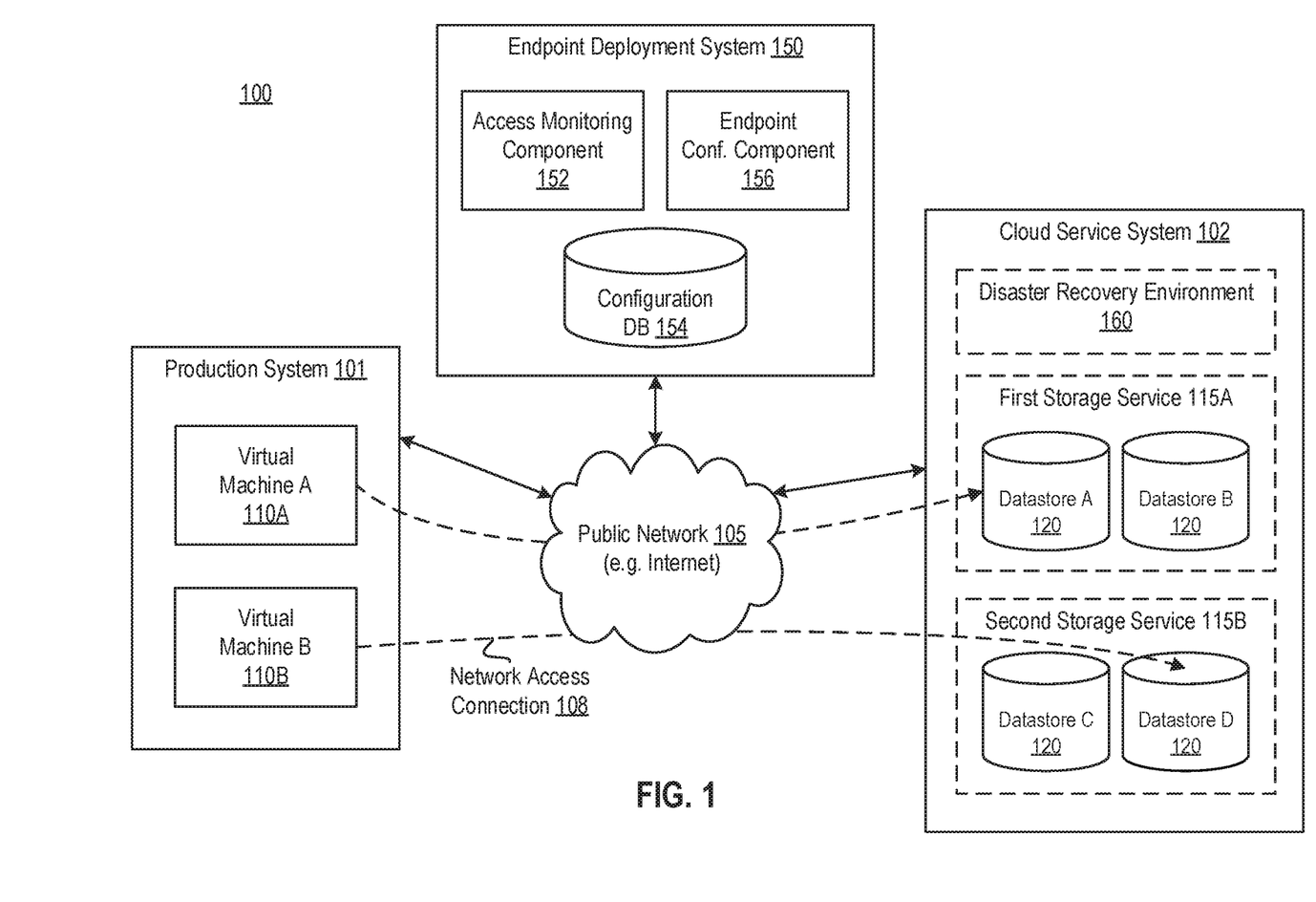
FIG. 1 is a block diagram illustrating an example operating environment for accessing storage services from a production system according to one or more embodiments of the disclosure.

More specifically, and with reference to FIG. 1, shown is a block diagram illustrating an example of an operating environment 100 for accessing storage services from a production system according to one or more embodiments of the disclosure. As shown, the operating environment 100 may include a production system 101, a cloud service system 102, and an endpoint configuration system 150, which may interact via a public network 105, which may be any type of wired or wireless network including a local area network (LAN), a wide area network (WAN), or a direct communication link, or other suitable connection. In some embodiments, the public network 105 may be an external network (e.g. the Internet) from the perspective of the cloud service system 102. This may be contrasted with a private network (or an internal, or secure, network) that may be provided within the cloud service system 102 as further described herein.

The production system (or on-premises system) 101 may include components that are live and/or used for providing resources to users. The production system 101 may include one or more virtual machines (VMs) 110. In general, each VM 110 may be a virtualization of underlying hardware and/or software and may be associated with various underlying components. Each of the VMs 110A-B may be associated with a particular client (or customer) of cloud-based services (e.g. "as-a-service" solutions) provided by the cloud service system 102. For example, the VMs 110 of the production system 101 may provide computing resources (e.g. webservers, databases, etc.) for users (e.g. website visitors) associated with the clients. VMs 110 may host one or more applications, and may include a local storage, as well as an interface for communicating with other systems and devices, such as the cloud service system 102.

In some embodiments, the production system 101 may also be provided as part of a cloud-based service. However, an entity providing the production system 101 may be different than the entity providing the cloud service system 102. Accordingly, the one or more physical components (e.g. servers) of the cloud service system 102 may be provided by a different entity than the entity that provides the physical components of the production system 101. For example, the production system 101 may be provided as part of Dell/EMC Data Domain™ data protection platform, and the cloud service system 102 may be provided by a different entity (e.g. Amazon Web Services (AWS) platform, Microsoft Azure platform, etc.). Accordingly, in some embodiments, the cloud service system 102 may be provided as part of a user-account managed by a distinct entity (e.g. Amazon, Microsoft, etc.) and associated with the client (or customer) of a VM 110.

The cloud service system (or on-demand system) 102 may provide on-demand computing resources such as storage services 115. The storage services 115 may provide one or more instances of a datastore (or service entity) 120. For example, a datastore 120 may be a particular database or object storage associated with a VM 110 of a client. The storage services 115 and datastores 120 may employ any suitable storage technique, infrastructure, and hardware (e.g. Solid State Drive (SSD), Hard Disk Drive (HDD), etc.). In operation, the VMs 110 (e.g. production VMs) may access a storage service 115 to store data within one or more datastores 120. As shown in this example, VM A 110A may access a datastore 120 (e.g. datastore A) provided by the first type of storage service 115A. The first storage service 115A may be associated with a database service, and accordingly, the datastore 120 (e.g. datastore A) may be a particular database. For example, the database storage service may include a MySQL database service provided by a first entity (e.g. as part of the Microsoft Azure platform).

Similarly, as shown, VM B 110B may access a datastore 120 (e.g. datastore D) provided by the second type of storage service 115B. The second storage service 115A may be associated with an object storage service, and accordingly, the datastore 120 (e.g. datastore D) may be a particular object storage. For example, the object storage service may include an object storage service provided by a second entity (e.g. as part of an AWS platform). Based on the different types of storage services 115 provided within the cloud service system 102, customized configurations for components (e.g. service endpoints) may be necessary as further described herein. For example, it may be required to configure a service endpoint specifically for each of the types of storage services 115, storage components, VMs 110, and/or entities providing such storage services 115.

In some embodiments, the cloud service system 102 may provide a disaster recovery environment 160, which may be an isolated and/or secure environment within the cloud service system 102. For example, recovery VMs (or recovery instances of the production VMs 110) may be created with the disaster recover environment 160 as further described herein.

The endpoint deployment system 150 may perform various functions to automatically create (or recommend) service endpoints to allow a recovery VM to directly access network infrastructure provided within the cloud service system 102. In some embodiments, the endpoint deployment system 150 may be a specialized system (or component) that may be added to a network configuration to execute the processes (or methods, operations, etc.) of the disclosure as described herein. As shown, the endpoint deployment system 150 may include an access monitoring component 152, a configuration database 154, and an endpoint configuration component 156. It should be noted that the endpoint deployment system 150, or any the components therein, may be part of a distinct system, the production system 101, the cloud service system 102, or a combination thereof.

The access monitoring component 152 may monitor (or intercept, analyze, etc.) various network access connections 108 from the production system 101 to the cloud service system 102 to identify particular types of connections such as network access connections 108 from the VMs 110 to the datastores 120. In some embodiments, the monitoring may include identifying accesses to storage services 115 that may be potential candidates for creating service endpoints by analyzing the URLs used to access the cloud service system 102. As further described herein, a service endpoint allows a component within the cloud service system to access a service directly using a private (or internal) network of the cloud service system 102. For example, a recovery VM may access a storage service 115 directly via a service endpoint.

Due to the large number of potential access connections occurring between a production system 101 and a cloud service system 102, the endpoint deployment system 150 may attempt to automate the process for automatically configuring and deploying service endpoints. For example, each service endpoint may need to be configured individually based on settings specific to each type of storage service 115 and datastore 12. For example, the endpoint deployment system 150 may perform an intelligent analysis (or heuristic) to automatically configure and deploy such service endpoints that would otherwise be unfeasible as a manual undertaking.

The endpoint deployment system 150 may leverage the unique structure (or pattern) used with a URL to access particular services. In some embodiments, the unique domain name service (DNS) name (e.g. domain name) associated with a service, and included as part of (or within) the URL, may be analyzed. For example, the access monitoring component 152 may parse the URL into various portions (or parts, components, etc.) for analysis. In some embodiments, the portions of a domain name may be analyzed to determine whether they are associated with particular service entities that provide particular services. The information derived from parsing the URLs such as a datastore and a storage service from portions of the URL may be stored as part of the configuration database 154. In addition, the configuration database 154 may store information required to determine whether a domain name is associated with a storage service providing the ability to create a service endpoint. For example, the configuration database 154 may store a predefined list of domain names and services that make available the ability to create service endpoints. For example, the configuration database 154 may store a predefined list of domain names (or entities associated with particular domain names) and storage services that are compared with portions of the URL to determine whether there is a match within the predefined list, which indicates a particular network access connection may be used to derive information for creating a service endpoint.

As described, the information derived (or obtained, determined, etc.) from an analysis of the URL may be stored as part of an entry in the configuration database 154. An entry may include one or more associated entries (or records, objects, etc.) that span one or more databases or data structures. In some embodiments, the derived datastore, storage service, and other information may be associated with information identifying the VM (e.g. source VM) that used the URL to access the cloud storage service 102. For example, information identifying the VM may include a network address (e.g. IP address), VM identifier, or other types of identifying information. In some embodiments, the source VM may be identified by providing the network address to an application programming interface (API) of the production system 102. For example, the API may include an API provided by a hypervisor that returns identifying information of the source VM in response to providing an IP address.

Based on the information collected, the endpoint configuration component 156 may configure service endpoints. In addition, the endpoint deployment system 150 may create or deploy such configured service endpoints within the cloud service system 102 as further described with reference to FIG. 2.

Figure 2:
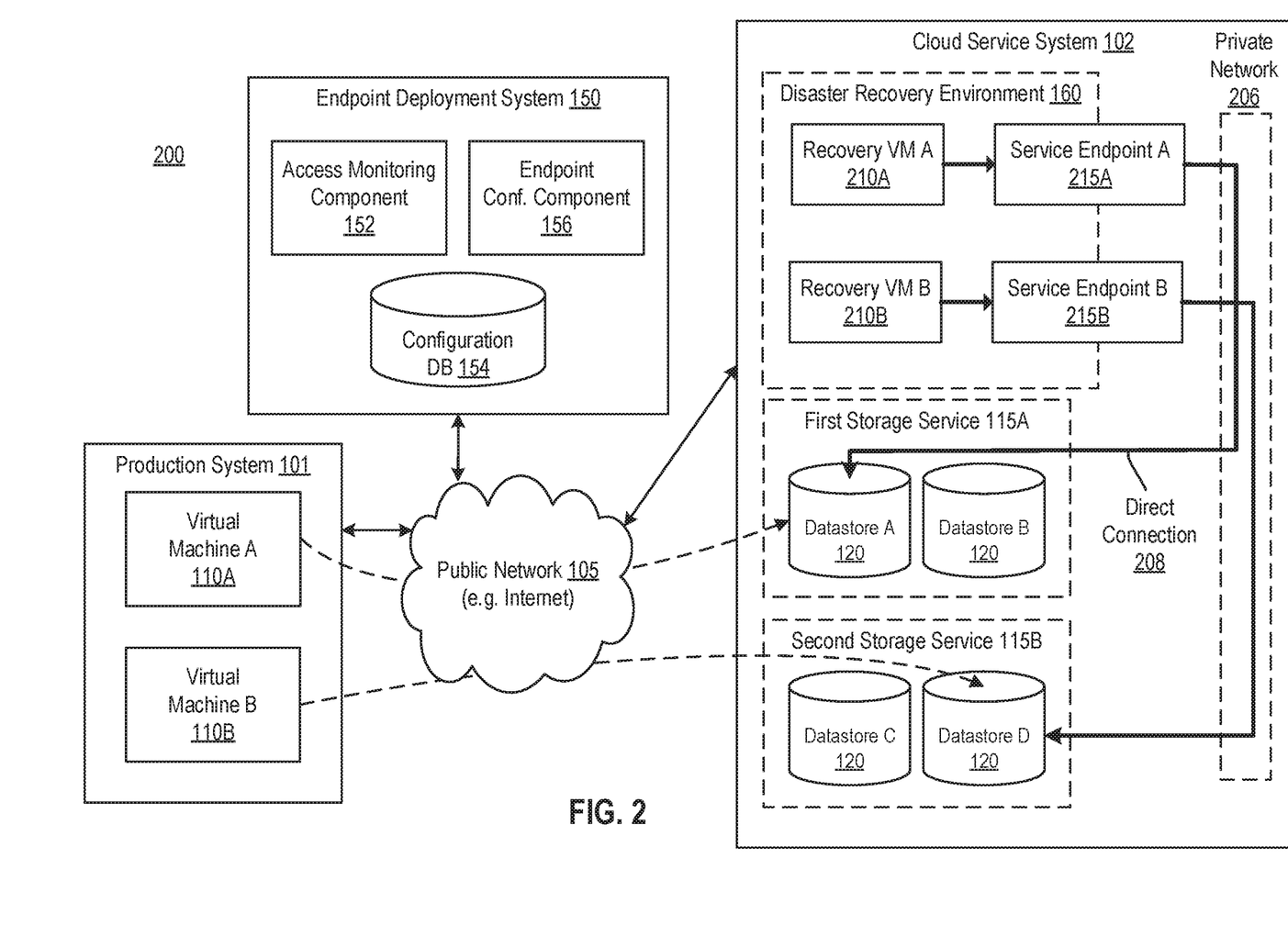
FIG. 2 is a block diagram illustrating an example operating environment for accessing storage services directly within a cloud service system using service endpoints according to one or more embodiments of the disclosure.

FIG. 2 is a block diagram 200 illustrating an example operating environment for accessing storage services directly within a cloud service system using service endpoints according to one or more embodiments of the disclosure.

As shown, in response to a recovery event, recovery VMs 210 may be created within the cloud service system 102. For example, recovery VMs 210 may be created as part of a data protection and recovery service offered to a client (or customer) of the cloud service system 102. For example, the recovery VMs 210 may be created using a RecoveryPoint product suite provided by Dell EMC™ Corporation. As shown, in some embodiments, the cloud service system 102 may provide the ability to create recovery VMs 210 within the disaster recovery environment 160. The disaster recovery environment 160 may include isolated and/or secure resources that provide a sandboxed environment within the cloud service system 102. Each recovery VM 210 may be an instance (or clone, copy, replica, etc.) of a corresponding VM 110 executing within the production system (e.g. production VM). As shown, specific recovery VMs 210 may be created for specific VMs 110. For example, as shown, recovery VM A 210A, may be created for, or correspond to, VM A 110A, and similarly, recovery VM B 210B, may be created for, or correspond to, VM B 110B.

As shown, instead of the recovery VMs 210 accessing an associated storage service 115 via the public network 105, each of the recovery VMs 210 may access an associated storage service 115 via the private network 206 within the cloud service system 102. For example, since the recovery VMs 210 may be created as part of a cloud service system 102 that also provides the storage service 115 for the original production VM 110, the recovery VMs 210 may leverage this configuration by creating a direct connection 208 to such storage services using the network infrastructure (e.g. private network 206) of the cloud service system 102. The private network 206 may be an internal network (or backbone) that is accessible only to components within the cloud service system 102. For example, the private network 206 may have additional security layers or protocols to secure data. In some embodiments, the private network 206 may include a virtual private network for a customer of services provided by the cloud service system 102.

As shown, the direct connection 208 may be provided through the use of service endpoints 215. As described, a service endpoint 215 may allow access to various services directly over a private network 206 of the cloud service system 102. In general, a service endpoint 215 may include an entity, processor, or resource that can be accessed by components (e.g. recovery VMs 210, client applications, etc.) using a computer-addressable location. In some embodiments, a service endpoint 215 may include, or be associated with, a network address (e.g. URL) where a storage service 115 can be accessed by a recovery VM 210 directly through the private network 206. For example, data transmissions between a recovery VM 210 to a storage service 115 may be routed exclusively through the private network 206 (e.g. without relying on the public network 106). In some embodiments, a service endpoint 215 may extend a virtual network private address space of a client (e.g. customer) within the cloud service system 102. For example, the service endpoint may include a Virtual Network (VNet) service endpoint (e.g. provided as part of the Azure platform) that allows a client to secure resources within a virtual network. In addition, a particular storage service 115 may have multiple service endpoints 215 to provide availability of the service via different protocols.

In operation, each service endpoint 215 may be configured specifically for the type of storage service 115 provided, the VMs 110/210, and/or the datastores 120. For example, the configuration settings for each type a service endpoint 215 may be based (e.g. dependent) on the type of storage service (e.g. database storage service, object storage service, etc.). Accordingly, as shown, recovery VM A 210A may access the first storage service 115A via the private network 206 using service endpoint A 215A, and recovery VM B 210B may access the second storage service 115B via the private network 206 using service endpoint B 215B, which is a different configuration, or different type of service endpoint, than service endpoint A 215A. For example, if the first storage service 115A is a database storage service, service endpoint A 215A may be a database service endpoint. Moreover, additional settings may be specified (e.g. presented to a user) that are specific to a database datastore. Similarly, if the second storage service 115B is an object storage service, service endpoint B 215B may be an object storage service endpoint. Moreover, additional settings may be specified (e.g. presented to a user) that are specific to an object datastore In addition, the configuration settings may include a set of rules for accessing a storage service 115. In some embodiments, the set of access rules may be based on the particular datastore 120. For example, each datastore 120 may have a set of policies that allow only certain VMs 110, clients, or user accounts, to access the datastore 120. Accordingly, the service endpoints 215 may be configured based on such access rules. For example, if datastore A of storage service A 215A only allows access to VM A 110 within a production setting, then the configuration settings for service endpoint A 215A may include enforcing the policy that only the corresponding recovery VM (e.g. recovery VM A 210A) may access datastore A. In some embodiments, the set of access rules may be associated with the datastore 120. Accordingly, the set of access rules may be stored on, or configured within, each datastore 120. Thus, in some embodiments, the endpoint deployment system 150 (e.g. via endpoint configuration component 156) may connect to the datastore 120 to configure (e.g. set, apply, etc.) such access rules, which may be stored on the datastore 120, and/or enforced by the datastore 120. In addition, the access rules may apply to a set of VMs that are part of a subnet. Accordingly, a set of access rules may be created for each service endpoint (or datastore) and associated subnet.

In some embodiments, the configuration settings may be recommended to a user before creation of a service endpoint 215. For example, the endpoint configuration component 156 may display a set of recommended settings for a service endpoint 215 on a graphical user interface (GUI). Accordingly, such settings may be confirmed, or modified, by a user before initiating the creation of a service endpoint on the cloud service system 102. For example, as part of a disaster recovery application, a client may be provided with the GUI to automatically configure and deploy service endpoints 215 for any created recovery VMs 210.

As described, the service endpoints 215 may be configured based on analyzing portions of a URL. For example, portions of a domain name may be analyzed to obtain information relating to a storage service as further described with reference to FIG. 3.

Figure 3:
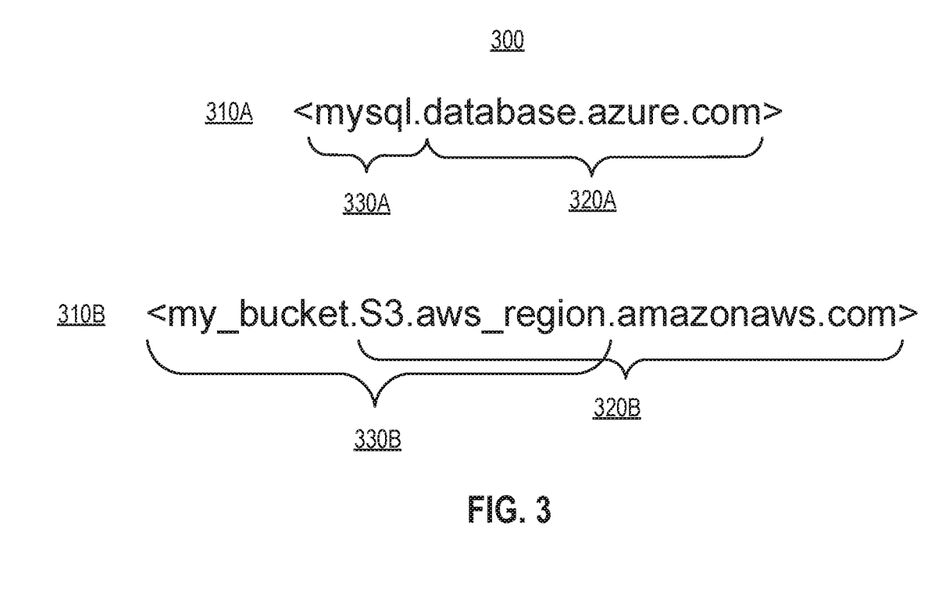
FIG. 3 is a diagram illustrating an example of parsing portions of a domain name to obtain information for configuring a service endpoint according to one or more embodiments of the disclosure.

FIG. 3 is a diagram 300 illustrating an example of parsing portions of a domain name to obtain information for configuring a storage service according to one or more embodiments of the disclosure.

As described, the unique structure (or pattern) of a unique domain name service (DNS) name (e.g. domain name) associated with a storage service may be analyzed. For example, as shown, the system (e.g. endpoint deployment system 150) may parse a domain name 310 into various portions 320/330 (or parts, components, etc.) for analysis.

As a first example, domain name 310A in the form of "mysql.database.azure.com" may be parsed into a first portion 320A of "database.azure.com" and a second portion 330A of "mysql". Accordingly, the first portion 320A may be analyzed and compared with a predefined list of domain names, and as a result, the system may determine at least a portion (e.g. "azure.com") of "database.azure.com" is associated with a storage service. For example, "azure.com" may be stored in a predefined list indicating that such a domain name is associated with a database storage service. In addition, the system may analyze the second portion 330A and determine the particular datastore associated with the database storage service (e.g. database datastore) is identified as "mysql". Accordingly, the system is capable of identifying a type of storage service (e.g. a database storage service) including an entity or platform (e.g. Azure platform) that provides the storage service, and a particular datastore (e.g. "mysql").

As a second example, domain name 310B in the form of "my_bucket.S3.aws_region.amazonaws.com" may be parsed into a first portion 320B of "S3.aws_region.amazonaws.com" and a second portion 330B of "my_bucket" or "my_bucket.S3.aws_region". Accordingly, the first portion 320B may be analyzed and compared with a predefined list of domain names, and as a result, the system may determine one or more portions (e.g. "s3", "amazonaws.com", or a combination thereof) is associated with a storage service. For example, "amazonaws.com" may be stored in a predefined list indicating that such a domain name provides a storage service. Moreover, "amazonaws.com" together with "s3" may indicate that the specific storage service provided (e.g. S3 storage service) is an object storage service. In addition, the system may analyze one or more portions of the second portion 330B (e.g. "my_bucket", "aws_region", or a combination thereof) and determine the particular datastore (e.g. object datastore) associated with the object storage service is identified as "my_bucket". Accordingly, the system is capable of determining a type of storage service (e.g. an object storage service) including an entity or platform (e.g. AWS platform) that provides the storage service, and a particular datastore (e.g. "my_bucket").

Accordingly, the information derived from parsing the domain names 310 may be stored (e.g. as an entry within the configuration database 154) and associated with additional information such a source VM that used the particular domain name 310A/B as part of a URL to access the cloud service system.

Figure 4:
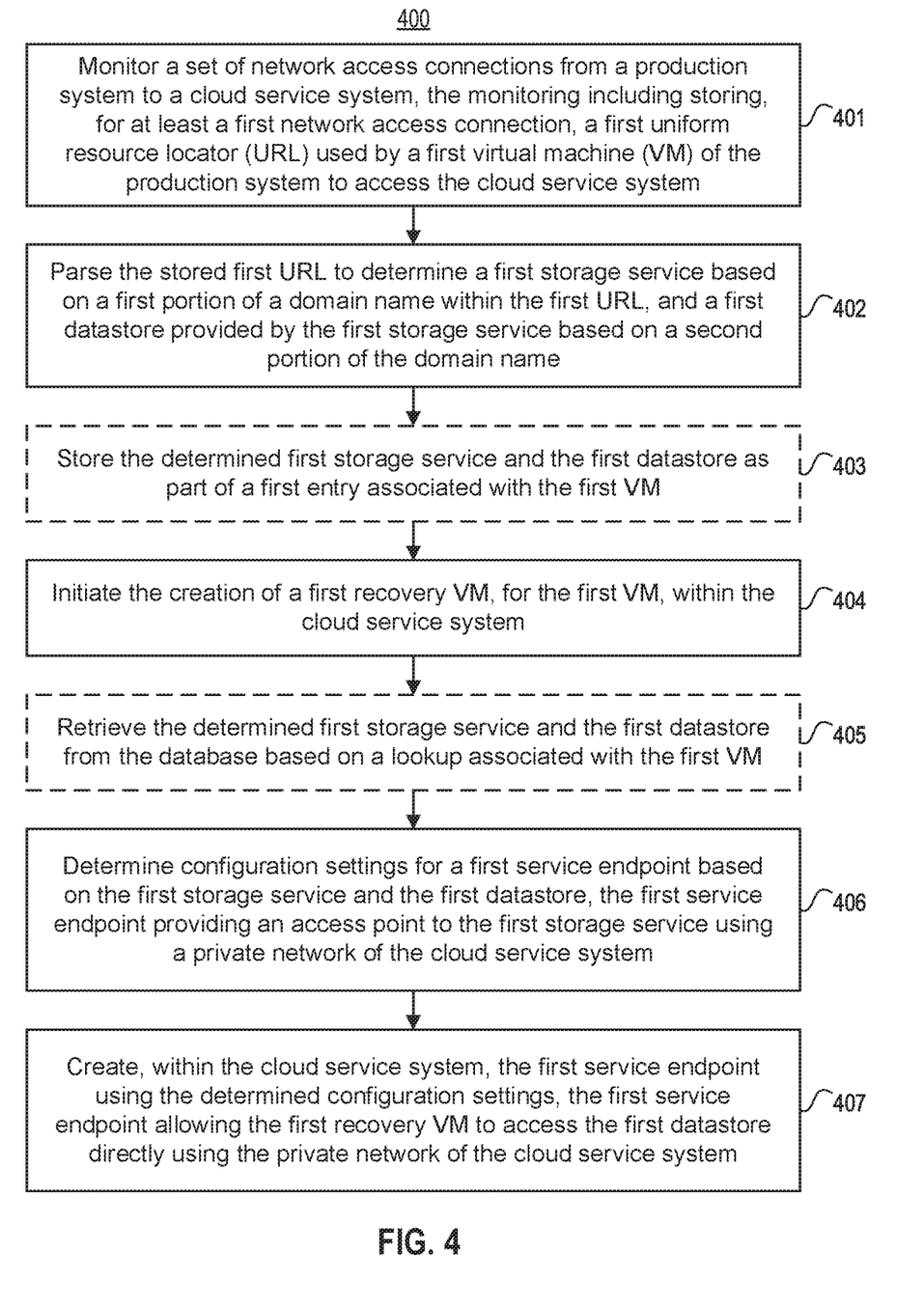
FIG. 4 is a flow diagram illustrating an example method of configuring service endpoints to directly access services of a cloud service system according to one or more embodiments of the disclosure.

FIG. 4 is a flow diagram illustrating an example method of configuring service endpoints to directly access services of a cloud service system according to one or more embodiments of the disclosure. Process 400 may use processing logic, which may include software, hardware, or a combination thereof. For example, process 400 may be performed by a system including one or more components described in operating environment 100.

In 401, the system (e.g. endpoint deployment system 150) may monitor a set of network access connections (e.g. network access connection 108) from a production system (e.g. production system 101) to a cloud service system (e.g. cloud service system 102). In some embodiments, the monitoring may include storing, for at least a first network access connection, information including a first uniform resource locator (URL) used by a first component such as a first virtual machine (VM) (e.g. virtual machine 110A) of the production system to access the cloud service system.

In some embodiments, the system may determine the component accessing the cloud service system is a VM. For example, the system may store, for the first network access connection, a network address of the component (e.g. the first VM), and then access the production system to identity the first VM based on the stored network address. In some embodiments, accessing the production system may include the system using an API to identify the component that accessed the cloud service system. For example, the system may provide, to the API, the known source network address (e.g. IP address) of the first network access to obtain an identifier of the first VM.

In 402, the system may parse the stored first URL to determine a first storage service based on a first portion of a domain name (e.g. portion 320) within the first URL. In addition, the system may determine a first datastore provided by the first storage service based on a second portion (e.g. portion 330) of the domain name.

In some embodiments, the system may first determine whether a network access connection to the cloud service system is associated with a storage service. For example, the system may perform a filtering to identify only those network access connections that may be associated with a service entity that provides a storage service, and only those storage services that may be accessible via a service endpoint. Accordingly, in some embodiments, the system may first parse the stored first URL to determine whether a first portion of a domain name within the first URL is associated with a service entity providing a storage service. In response to determining the first portion of the domain name is associated with the first service entity, the system may determine a first storage service provided by the first service entity based on a first portion of the domain name. For example, the system may compare a portion of the domain name to a predefined list of domain names associated with entities and/or storage services that provide to ability to create service endpoints. If the portion of the domain name matches a domain name stored in the list, the system can proceed to determine additional details such as a particular type of storage service (e.g. database storage service, or object storage service, etc.) or datastore associated with the service entity. In addition, the system may mark (or tag, flag, etc.) the particular network access connection as being a candidate for a service endpoint. Thus, if it is determined that a network access is not associated with a particular service entity or storage service, the system may forego (or skip, bypass, etc.) the process of determining additional details such as whether the network access connection is associated with a particular type of datastore or storage service.

Optionally, in 403, the system may store, within a database (e.g. configuration database 154), the determined first storage service (e.g. storage service 115A) and the first datastore (e.g. datastore A 120) as part of a first entry associated with the first VM. In some embodiments, the first storage service and the first datastore may be stored with an identifier of the first VM. For example, the first entry may include at least the determined first storage service, the determined first datastore, and an identifier of the first VM. In some embodiments, the entry (or tuple) may be in the form of [VM identifier, storage service, datastore]. In some embodiments, the service endpoints may be created for a set of VMs that are part of a subnet. Accordingly, in such embodiments, the entry may be in the form of [subnet, VM, storage service, datastore].

It should be noted that in some embodiments, the system may parse the URL prior to a recovery event. For example, the system may store the derived storage service and particular datastore to the database, and the information may then be retrieved in response to creating a recovery VM. For example, the system may perform a lookup of the storage service and datastore using information associated with the original production VM (e.g. VM identifier, address, etc.) that corresponds to the recovery VM.

In 404, the system may initiate the creation of a first recovery VM (e.g. recovery VM 210), for the first VM, within the cloud service system. In some embodiments, the system may initiate the creation of a first recovery VM, in response to a recovery event associated with the first VM. For example, the recovery event may include any scenarios associated with a data loss or a system being compromised (e.g. via malware, virus, etc.) that may result in the need to create a recovery VM. In some embodiments, the first recovery VM may be created within a disaster recovery environment (e.g. disaster recovery environment 160) provided by the cloud storage service and may be a copy (e.g. instance) of the first VM (e.g. production VM). For example, the system may create the first recovery VM as part of an available data protection and recovery service.

Optionally, in 405, the system may retrieve the determined first storage service and the first datastore from the database based on a lookup associated with the first VM. In some embodiments, the determined first storage service and the first datastore may be retrieved in response to creating the first recovery VM. Alternatively, in some embodiments, the system may determine the storage service and datastore in response to the creation of a recovery VM. For example, in some embodiments, the system may store only the URL (or domain name), along with an identifier of a source VM, and the system may parse the URL (or domain name) in response to a recovery event. For example, the system may derive the storage service and datastore from the stored URL after creating a recovery VM.

In 406, the system may determine configuration settings for a first service endpoint (e.g. service endpoint 215A) based on the determined first storage service and the first datastore. In some embodiments, the configuration settings for the first service endpoint may include a first service endpoint type (e.g. database or object storage service) based on the type of first storage service, and a first set of access rules based on the first datastore. For example, each datastore may have a set of rules (or policies) that allow only certain VMs, clients, or user accounts, to access the datastore. Accordingly, the set of access rules may determine which recover VMs, or recovery VMs associated with a subnet may be allowed to access a particular datastore (or storage service).

In some embodiments, the system may recommend (or provide) the determined configuration settings to a user, which the user may confirm or modify. For example, the system may provide, on a graphical user interface (GUI), the determined configuration settings. The system may then receive, via the GUI, user input confirming (or modifying) the configuration settings. In response to receiving the user input confirming the configuration settings, the system may create the first service endpoint within the cloud service system.

In 407, the system may create, within the cloud service system, the first service endpoint (e.g. service endpoint 215A) using the determined configuration settings. Accordingly, the first service endpoint allows the first recovery VM to access the first datastore (e.g. datastore A 120) of the first storage service (e.g. storage service 115A) directly using the private network of the cloud service system. In some embodiments, certain settings such as access rules may be configured by accessing the datastore (or storage service). Accordingly, creating the first service endpoint may include connecting to the first datastore to configure a first set of access rules.

As described, the system may create specific service endpoints for various storage services. Accordingly, the process may include creating a second service endpoint. For example, the system may determine configuration settings for a second service endpoint based on, a second storage service and a second datastore, which are determined from parsing a second URL used by a second virtual machine (VM) (e.g. second VM 110B) to access the cloud service system. For example, the second URL may be stored from monitoring a second network access connection. Accordingly, the system may create, within the cloud service system, the second service endpoint (e.g. service endpoint 215B) using the determined configuration settings. Accordingly, the second service endpoint may allow a second recovery VM (e.g. recovery VM 210B) to access a second datastore (e.g. datastore D 120) of the second storage service (e.g. storage service 115B) directly using the private network of the cloud service system. In some embodiments, the configuration settings for the second service endpoint may include a second service endpoint type based on the type of second storage service, and a second set of access rules based on the second datastore. In addition, creating the second service endpoint may include connecting to the second datastore (or second storage service) to configure the second set of access rules.

As described, the access rules may prevent unauthorized components (e.g. recovery VMs) from accessing particular datastores or storage services. For example, the first recovery VM (e.g. recovery VM 210A) may not be authorized to access an unrelated storage services (e.g. storage service 115B). Accordingly, in some embodiments, the first set of access rules may prevent the second recovery VM from accessing the first datastore (e.g. datastore A 120), and the second set of access rules may prevent the first recovery VM from accessing the second datastore (e.g. datastore D 120).

In addition, in some embodiments, a service endpoint may be created for a set (or subsets) of recovery VMs. For example, a service endpoint may be created for a set of recovery VMs that are part of a subnetwork (or subnet). Accordingly, in some embodiments, the first VM of the production system may associated with a first subnetwork, and accordingly, the first service endpoint may allow a set of recovery VMs associated with the first subnetwork to access the first datastore (or first storage service) using the private network of the cloud service system.

Accordingly, in some embodiments, the process provides the ability to automatically configure and deploy service endpoints by leveraging information derived from monitoring network access connections between a production system and a cloud service system.

As noted, the operations (or steps) shown in the above processes are not necessarily performed in the order indicated and may be performed in parallel, as a single operation, or as multiple operations. For example, the system may determine a storage service and/or a datastore before, concurrently with, or after, initiating the creation of a recovery VM.

Figure 5:
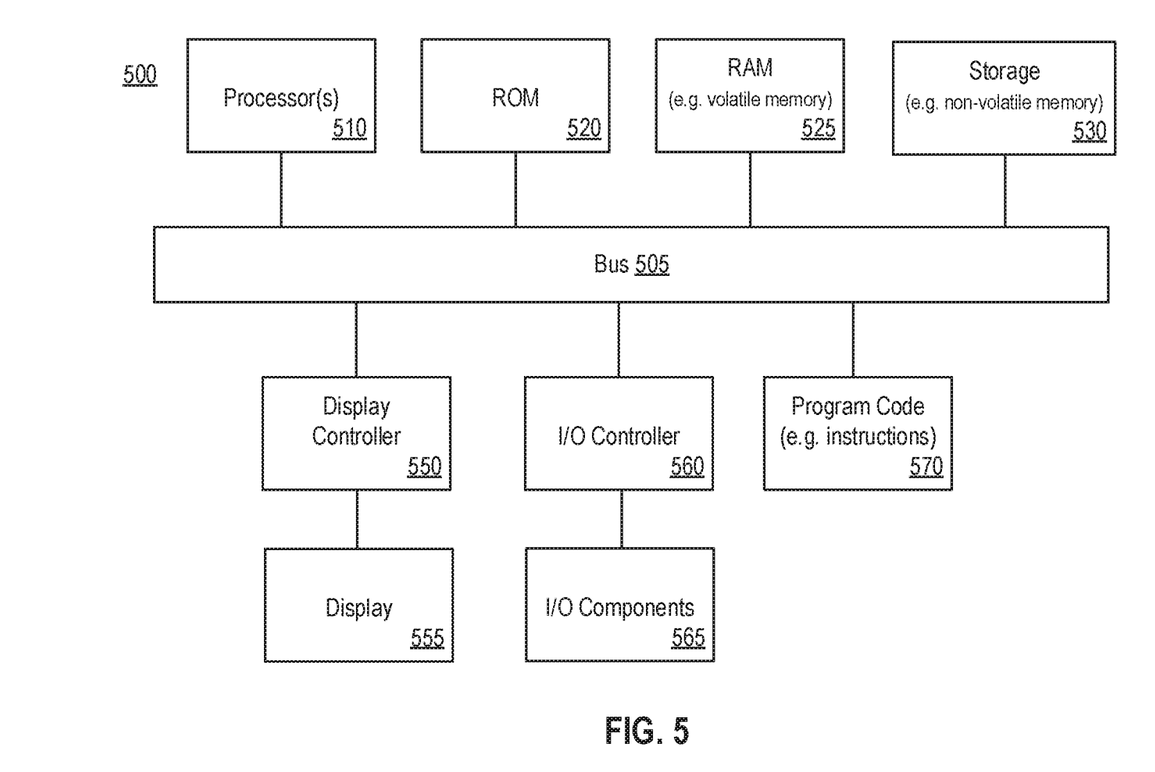
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. endpoint deployment system 150) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. endpoint deployment system 150, access monitoring component 152, configuration database 154, endpoint configuration component 156, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
monitor a set of network access connections from a production system to a cloud service system, the monitoring including storing, for at least a first network access connection, a first uniform resource locator (URL) used by a first virtual machine (VM) of the production system to store data on the cloud service system over a network connection;
parse the stored first URL to determine a first storage service containing data from the first VM based on a first portion of a domain name within the first URL, and a first datastore containing the data from the first VM provided by the first storage service based on a second portion of the domain name;
initiate a creation of a first recovery VM, for the first VM, within the cloud service system;
determine configuration settings for a first service endpoint based on the first storage service and the first datastore, the first service endpoint providing an access point to the first storage service using a private network of the cloud service system; and
create, within the cloud service system, the first service endpoint using the determined configuration settings, the first service endpoint allowing the first recovery VM to access the data from the first VM on the first datastore using the private network of the cloud service system.

2. The system of claim 1, wherein the plurality of instructions, when executed, further cause the one or more processors to:
provide, on a graphical user interface (GUI), the determined configuration settings;
receive, via the GUI, user input confirming the configuration settings; and
create, within the cloud service system, the first service endpoint, in response to receiving the user input confirming the configuration settings.

3. The system of claim 1, wherein the plurality of instructions, when executed, further cause the one or more processors to:
store, within a database, the determined first storage service the first datastore as part of a first entry associated with the first VM; and
in response to creating the first recovery VM, retrieve the determined first storage service and the first datastore from the database based on a lookup associated with the first VM.

4. The system of claim 3, wherein the first entry includes at least the determined first storage service, the determined first datastore, and an identifier of the first VM.

5. The system of claim 1, wherein the plurality of instructions, when executed, further cause the one or more processors to:

store, for at least the first network access connection, a network address of the first VM; and access the production system to identity the first VM based on the stored network address as a component using the first URL to access the cloud service system.

6. The system of claim 1, wherein the first VM of the production system is associated with a first subnetwork, and the first service endpoint allows a set of recovery VMs associated with the first subnetwork to access the first datastore using the private network of the cloud service system.

7. The system of claim 1, wherein the plurality of instructions, when executed, further cause the one or more processors to:

determine configuration settings for a second service endpoint based on, a second storage service and a second datastore, determined from parsing a second URL used by a second virtual machine (VM) to access the cloud service system; and create, within the cloud service system, the second service endpoint using the determined configuration settings, the second service endpoint allowing a second recovery VM to access the second datastore directly using the private network of the cloud service system.

8. The system of claim 7, wherein:

the configuration settings for the first service endpoint include a first service endpoint type based on the first storage service, and a first set of access rules based on the first datastore; and the configuration settings for the second service endpoint include a second service endpoint type based on the second storage service, and a second set of access rules based on the second datastore.

9. The system of claim 8, wherein:

creating the first service endpoint includes connecting to the first datastore to configure the first set of access rules; and creating the second service endpoint includes connecting to the second datastore to configure the second set of access rules.

10. The system of claim 9, wherein the first set of access rules prevent the second recovery VM from accessing the first datastore, and the second set of access rules prevent the first recovery VM from accessing the second datastore.

11. A method comprising:

monitoring, by a system, a set of network access connections from a production system to a cloud service system, the monitoring including storing, for at least a first network access connection, a first uniform resource locator (URL) used by a first virtual machine (VM) of the production system to store data on the cloud service system over a network connection;

parsing, by the system, the stored first URL to determine a first storage service containing data from the first VM based on a first portion of a domain name within the first URL, and a first datastore containing the data from the first VM provided by the first storage service based on a second portion of the domain name;

initiating, by the system, a creation of a first recovery VM, for the first VM, within the cloud service system;

determining, by the system, configuration settings for a first service endpoint based on the first storage service and the first datastore, the first service endpoint providing an access point to the first storage service using a private network of the cloud service system; and creating, within the cloud service system, the first service endpoint using the determined configuration settings, the first service endpoint allowing the first recovery VM to access the data from the first VM on the first datastore using the private network of the cloud service system.

12. The method of claim 11, further comprising:

providing, on a graphical user interface (GUI), the determined configuration settings;

receiving, via the GUI, user input confirming the configuration settings; and creating, within the cloud service system, the first service endpoint, in response to receiving the user input confirming the configuration settings.

13. The method of claim 11, further comprising:

storing, within a database, the determined first storage service the first datastore as part of a first entry associated with the first VM; and in response to creating the first recovery VM, retrieving the determined first storage service and the first datastore from the database based on a lookup associated with the first VM.

14. The method of claim 13, wherein the first entry includes at least the determined first storage service, the determined first datastore, and an identifier of the first VM.

15. The method of claim 11, further comprising:

storing, for at least the first network access connection, a network address of the first VM; and accessing the production system to identity the first VM based on the stored network address as a component using the first URL to access the cloud service system.

16. A computer program product comprising a non-transitory computer-readable medium having a computer-readable program code embodied therein to be executed by one or more processors, the program code including instructions to:

monitor a set of network access connections from a production system to a cloud service system, the monitoring including storing, for at least a first network access connection, a first uniform resource locator (URL) used by a first virtual machine (VM) of the production system to store data on the cloud service system over a network connection;

parse the stored first URL to determine a first storage service containing data from the first VM based on a first portion of a domain name within the first URL, and a first datastore containing the data from the first VM provided by the first storage service based on a second portion of the domain name;

initiate a creation of a first recovery VM, for the first VM, within the cloud service system;

determine configuration settings for a first service endpoint based on the first storage service and the first datastore, the first service endpoint providing an access point to the first storage service using a private network of the cloud service system; and create, within the cloud service system, the first service endpoint using the determined configuration settings, the first service endpoint allowing the first recovery VM to access the data from the first VM on the first datastore using the private network of the cloud service system.

17. The computer program product of claim 16, wherein the program code includes further instructions to:

provide, on a graphical user interface (GUI), the determined configuration settings;

receive, via the GUI, user input confirming the configuration settings; and create, within the cloud service system, the first service endpoint, in response to receiving the user input confirming the configuration settings.

18. The computer program product of claim 16, wherein the program code includes further instructions to:

store, within a database, the determined first storage service the first datastore as part of a first entry associated with the first VM; and in response to creating the first recovery VM, retrieve the determined first storage service and the first datastore from the database based on a lookup associated with the first VM.

19. The computer program product of claim 18, wherein the first entry includes at least the determined first storage service, the determined first datastore, and an identifier of the first VM.

20. The computer program product of claim 16, wherein the program code includes further instructions to:

store, for at least the first network access connection, a network address of the first VM; and access the production system to identity the first VM based on the stored network address as a component using the first URL to access the cloud service system.

* * * * *